United States Patent

Wojewoda et al.

[11] Patent Number: 6,029,241
[45] Date of Patent: Feb. 22, 2000

[54] PROCESSOR ARCHITECTURE SCHEME HAVING MULTIPLE BANK ADDRESS OVERRIDE SOURCES FOR SUPPLYING ADDRESS VALUES AND METHOD THEREFOR

[75] Inventors: Igor Wojewoda, Phoenix; Sumit Mitra, Tempe; Rodney J. Drake, Phoenix, all of Ariz.

[73] Assignee: Microchip Technology Incorporated, Chandler, Ariz.

[21] Appl. No.: 08/959,405

[22] Filed: Oct. 28, 1997

[51] Int. Cl.[7] .................................................... G06F 12/06
[52] U.S. Cl. ................................................. 712/38; 712/32
[58] Field of Search .......................... 395/800.38, 800.32, 395/800.01, 800.39, 800.34; 712/38, 32, 1, 39, 34

[56] References Cited

U.S. PATENT DOCUMENTS

| | | | |
|---|---|---|---|
| 4,047,245 | 9/1977 | Knipper | 711/213 |
| 4,118,773 | 10/1978 | Joyce et al. | |
| 4,685,084 | 8/1987 | Canepa | |
| 5,247,644 | 9/1993 | Johnson et al. | 711/157 |
| 5,751,988 | 5/1998 | Fujimura | 395/405 |

FOREIGN PATENT DOCUMENTS 0 463 855 A2   1/1992   European Pat. Off. .
0 518 479 A2   12/1992  European Pat. Off. .

*Primary Examiner*—Meng-Ai T. An
*Assistant Examiner*—Mackly Monestime
*Attorney, Agent, or Firm*—Paul N. Katz; Ronald L. Chichester; Frhwitter

[57] ABSTRACT

A processor architecture scheme which allows for encoding multiple addressing modes and which has multiple sources for generating a bank address value. The processor architecture scheme has a Central Processing Unit (CPU) for executing an instruction set. A data memory is coupled to the CPU. The data memory is used for storing and transferring data to and from the CPU. The data memory is divided into a plurality of banks wherein one of the plurality of banks is a dedicated bank for general and special purpose registers. A selection circuit is coupled to the data memory. The selection circuit is used for selecting one of the multiple sources for generating the bank address value. A bank select register is coupled to the selection circuit. The bank select register is used for supplying a bank address value for an instruction to be executed in a direct short addressing mode. An instruction register is coupled to the selection circuit for supplying a bank address values for an instruction to be executed in a direct long addressing mode and for supplying a register address within a bank for the instruction to be executed in a direct short addressing mode.

5 Claims, 2 Drawing Sheets

PROCESSOR ARCHITECTURE SCHEME HAVING MULTIPLE BANK ADDRESS OVERRIDE SOURCES FOR SUPPLYING ADDRESS VALUES AND METHOD THEREFOR

RELATED APPLICATIONS

This application is related to pending U.S. patent applications entitled "FORCE PAGE ZERO PAGING SCHEME FOR MICROCONTROLLERS USING DATA RANDOM ACCESS MEMORY," filed U.S. application Ser. No. 08/887,876 Jul. 3, 1997, in the name of Randy L. Yach, and "PROCESSOR ARCHITECTURE SCHEME FOR IMPLEMENTING VARIOUS ADDRESSING MODES AND METHOD THEREFOR," U.S. application Ser. No. 08/946,426, filed on Oct. 7, 1997, in the name of Mitra et al., both of which are assigned to the same assignee as the present patent application. The disclosure of the above referenced applications are hereby incorporated by reference into this patent application.

BACKGROUND OF THE INVENTION

1. Field of the Invention

This invention relates generally to data addressing and, more specifically, to a processor architecture scheme which allows for encoding multiple addressing modes and which has multiple sources for generating bank address values and method therefor.

2. Description of the Prior Art

Generally speaking, a processor is an entity where a central processing unit (CPU) is present and is used to fetch and execute stored instructions or microcode. Some examples of processors are microcontrollers, microprocessors, and digital signal processors. Each type of processor operates on data which is also commonly referred to as operands. This data is generally stored in registers or memory space.

In many processor architecture schemes, adding or changing addressing modes is extremely difficult. Without major changes to the instruction set organization, such changes and additions to the addressing modes are not possible. However, changes to the instruction set structure is not desirable since many tools such as assemblers and compilers will also require dramatic changes.

Some current processor architectures use a paging scheme to address all of the data memory in the processor. In addition to the problems stated above, these types of processors have several other problems associated with them. In order to increase addressable address space, many processors implement multiple banks in their data memory. However, these processors only have one source for generating bank address values, the bank select register. Since there is only one source for generating bank address values, any instruction that needs to be executed has to access a register address in the current bank. If the instruction needs to access a register address in a different bank, the value in the bank select register has to be changed. This scheme is extremely cumbersome in that it takes several instructions to make sure the user is writing or reading the proper address in the RAM.

These types of processors also complicate the job of the C-compiler because the C-compiler must keep track of which bank is currently selected in the data memory. This presents even more problems when handling interrupts. When handling interrupt requests, the processor must have direct access to general and special function registers. If these registers are not in the currently selected bank, the bank select register must be changed to the proper bank. Once the interrupt request has been serviced, the processor must remember and return to the bank and register of the instruction being executed by the processor prior to the interrupt.

Therefore, a need existed to provide an improved processor architecture scheme and method therefor. The improved processor architecture scheme and method would allow for multiple addressing schemes. The improved processor architecture scheme and method would further have the ability to override the bank register in order to generate a complete data address. The improved processor architecture scheme and method would also allow for the processor to handle interrupt request without changing the bank select register and thus the bank address value of the current instruction being executed prior to the interrupt request.

SUMMARY OF THE INVENTION

In accordance with one embodiment of the present invention, it is an object of the present invention to provide an improved processor architecture scheme and method therefor.

It is another object of the present invention to provide an improved processor architecture scheme and method therefor that allows for multiple addressing schemes by overriding bank addressing.

It is yet another object of the present invention to provide an improved processor architecture scheme and method therefor that has multiple sources for generating bank address values by overriding bank addressing.

It is still a further object of the present invention to provide an improved processor architecture scheme and method therefor that has multiple sources for generating bank address values and that would allow the processor to handle interrupt requests without changing the bank select register and thus the bank address value of the current instruction being executed prior to the interrupt request.

BRIEF DESCRIPTION OF THE PREFERRED EMBODIMENTS

In accordance with one embodiment of the present invention, a processor architecture scheme which allows for encoding multiple addressing modes and which has multiple sources for generating a bank address value and overriding the bank select register is disclosed. The processor architecture scheme has a Central Processing Unit (CPU) for executing an instruction set. A data memory is coupled to the CPU. The data memory is used for storing and transferring data to and from the CPU. The data memory is divided into a plurality of banks wherein one of the plurality of banks is a dedicated bank for general and special purpose registers. A selection circuit is coupled to the data memory. The selection circuit is used for selecting one of the multiple sources for generating the bank address value by overriding the bank select register. A bank select register is coupled to the selection circuit. The bank select register is used for supplying a bank address value for an instruction to be executed in a direct short addressing mode. An instruction register is coupled to the selection circuit for supplying a bank address values for an instruction to be executed in a direct long addressing mode and for supplying a register address within a bank for the instruction to be executed in a direct short addressing mode.

In accordance with another embodiment of the present invention, a method for providing a processor architecture scheme which allows for encoding multiple addressing modes and which has multiple sources for generating a bank address value by overriding the bank select register is disclosed. The method comprises the steps of: providing a Central Processing Unit (CPU) for executing an instruction set; providing a data memory coupled to the CPU and having a plurality of banks, wherein one of the plurality of banks is a dedicated bank to general and special purpose registers; providing a selection circuit coupled to the data memory for selecting one of the multiple sources for generating the bank address value; providing a bank select register coupled to the selection circuit for supplying a bank address value for an instruction to be executed in a direct short addressing mode; and providing an instruction register coupled to the selection circuit for supplying a bank address value for an instruction to be executed in a direct long addressing mode and for supplying a register address within a bank for the instruction to be executed in a direct short addressing mode.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
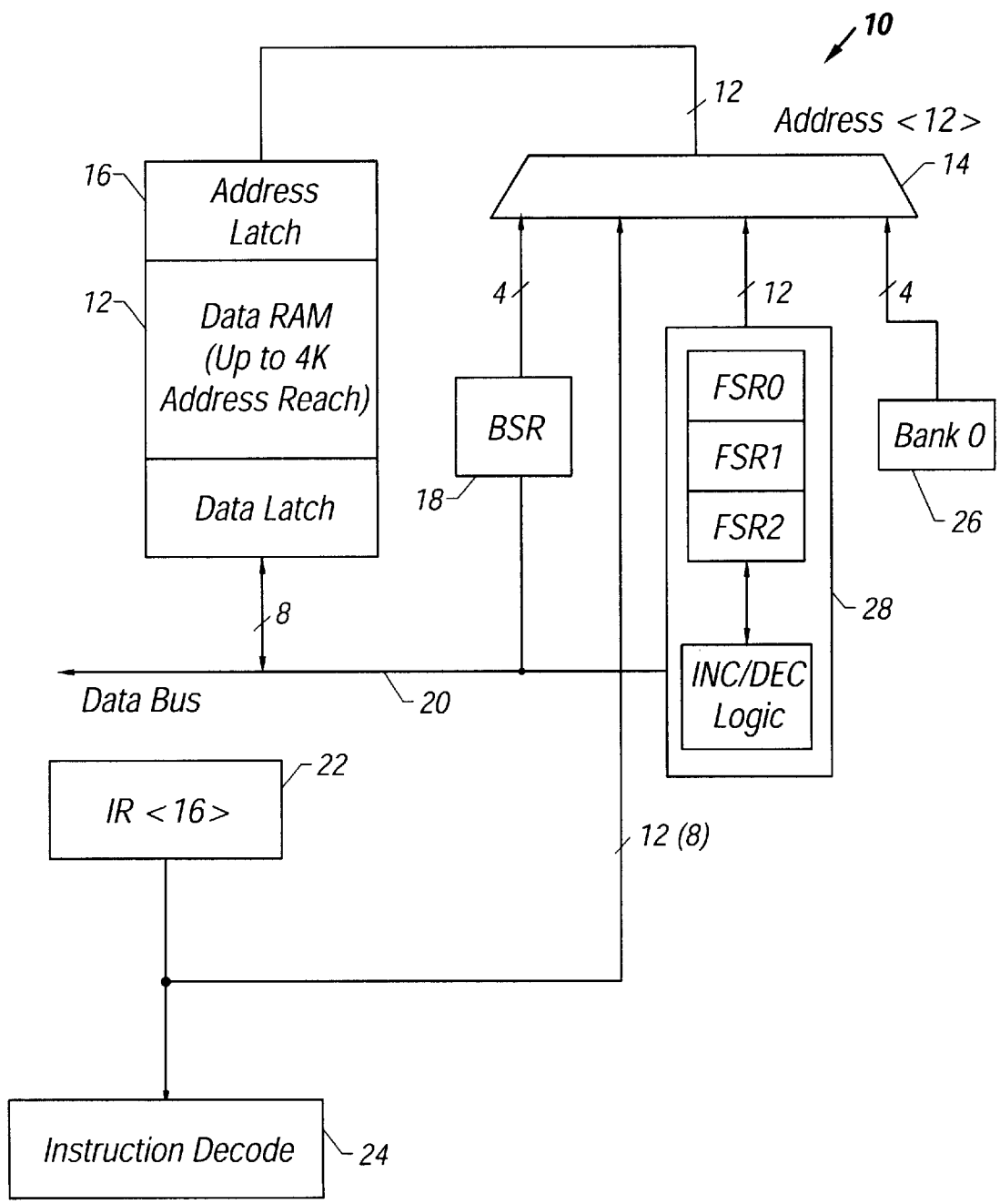
FIG. 1 is a simple block diagram of an addressing system for generating bank addresses from multiple sources.
Figure 2:
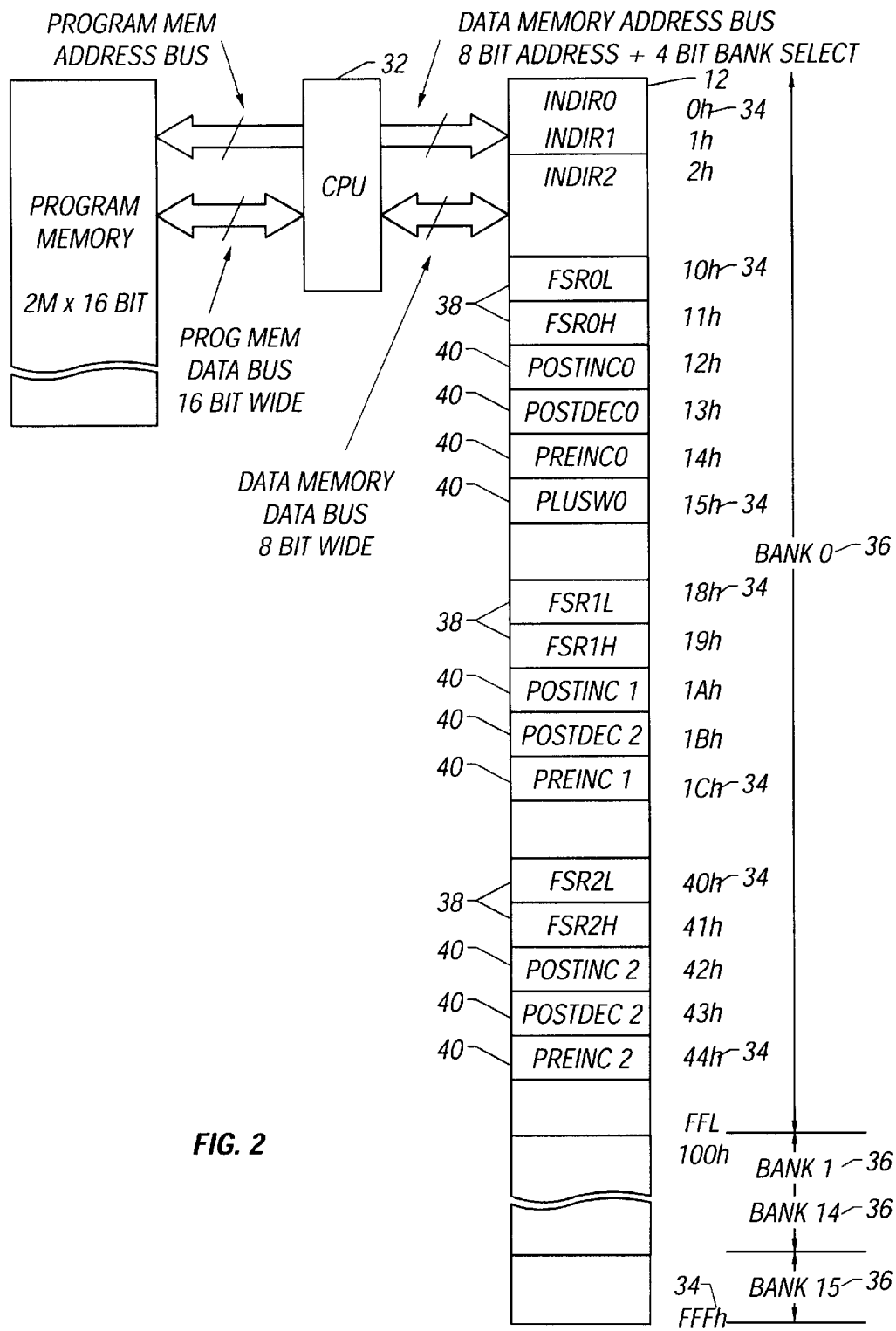
FIG. 2 is a processor architecture scheme used with the addressing system depicted in FIG. 1.

Referring to FIGS. 1 and 2 wherein like numerals and symbols represent like elements, a system 10 for supplying bank address values from a plurality of sources is shown. The system 10 is used for addressing a data memory 12. The data memory 12 is used for storing and transferring data to and from a Central Processing Unit (CPU) 32. The data memory 12 is comprised of a plurality of address locations 34. In the embodiment shown in FIG. 2, the data memory 12 is a linearized 4K memory which is divided into a plurality of pages or banks 36 (i.e., 16 banks in the present embodiment shown in FIG. 2). Each bank 36 has 256 address locations 34. In the preferred embodiment of the present invention, one of the plurality of banks 36 is a dedicated bank to general and special purpose registers. In the embodiment depicted in FIG. 2 Bank 0 is the dedicated bank.

A selection circuit 14 is coupled to the data memory 12 through an address latch 16. The selection circuit 14 is used for selecting one of the plurality of sources that supply the bank address values and for overriding the bank select register and sending a complete 12-bit (long) address value to the address latch 16. In the preferred embodiment of the present invention, the selection circuit 14 sends a 12 bit address to the address latch 16. A 12 bit address will be able to access the entire address range of the 4K data memory 12. In the preferred embodiment of the present invention, the selection circuit 14 is a multiplexer.

A bank select register 18 has an input coupled to a data bus 20 and an output coupled to the selection circuit 14. The bank select register 18 is used for supplying a bank address value for an instruction to be executed in a direct short addressing mode. In the embodiment depicted in FIG. 1, the bank select register 18 is a 4 bit wide register. The bank select register 18 thus supplies the bank address value of the current bank 36 which is accessible. The actual address location 34 within the currently selected bank 36 will come from the instruction register 22.

The instruction register 22 is directly coupled to an instruction decode unit 24 and to the selection circuit 14. As stated above, the instruction register 22 is used for storing and sending the register address 34 within the currently selected bank 36 for an instruction to be executed in a direct short addressing mode. In the embodiment depicted in FIG. 1, the instruction register 22 will send an 8 bit register address to the selection circuit 14. The 8 bit register address is combined with the 4 bit bank address value from the bank select register 18 to determine the exact address location within the data memory 12.

The instruction register 22 also supplies the bank address value for an instruction to be executed in a direct long addressing mode by overriding the bank select register 18. In the preferred embodiment of the present invention, the instruction register 22 is large enough to access the entire address range of the data memory 12 when operating in a direct long addressing mode. In the embodiment depicted in FIG. 1, the instruction register 22 generates a 12 bit wide address. Thus, the instruction register 22 is able to access the entire address range of the 4K data memory 12. The instruction register 22 thus provides a simple and convenient method to directly access any register within the data memory 12. However, the direct long addressing mode, is a two word two cycle operation. Thus, the convenience comes at the expense of speed.

A force bank register 26 has an output directly coupled to an input of the selection circuit 14. The force bank register 26 is used for supplying the bank address value of the bank dedicated to general and special purpose registers. When accessed, the force bank register 26 will force data access to take place on the dedicated bank by overriding the bank select register 18 while not modifying the currently selected bank address to be executed. In the preferred embodiment of the present invention, the dedicated bank is bank 0.

One way to initiate a force bank mode of operation is to have a dedicated bit in each file register related op-code instruction of the processor. When the bit is set, the output of the force bank register 26 will force data access to take place on the dedicated bank (i.e., bank 0) of the data memory 12. The setting of the dedicated bit does not affect the current operation of the processor. It also does not modify the currently selected bank address stored in an op-code instruction being executed by the processor since none of the other multiple sources for generating bank address values will be altered. Thus, no matter where the user is in the data memory 12, if the dedicated bit is set in the instruction, the current instruction will always affect the dedicated bank (i.e., bank 0) which stores the special and general purpose registers. Thus, if a user is in the general purpose data memory area (i.e., any page except the first bank, bank 0) and receives an interrupt, the interrupt service routine can set the dedicated bit in the op-code instruction. The user may then deal with the special and general purpose registers without affecting anything else the processor was performing. When the interrupt has been properly serviced, the processor may go back to the selected bank address stored in an op-code instruction being executed by the processor since it was not altered during the service of the interrupt.

File select registers 28 have an output directly coupled to an input of the selection circuit 14. The file select registers 28 are used for storing and supplying the bank address values for an indirect addressing mode. The file select register 28 are of sufficient size to access the entire address range of the data memory 12. In the embodiment depicted in FIG. 1, the file select registers 28 are 12 bit wide registers capable of accessing the entire address range of the 4K data memory 12.

In order to set up the indirect addressing mode, at least one data pointer register 38 is implemented in data memory 12. The data memory 12 is comprised of a plurality of address locations 34. In the embodiment shown in FIG. 2, the data memory 12 is a linearized 4K memory which is divided into a plurality of banks 36 wherein each bank 36 has 256 address locations 34. The data pointer register 38 has one or more virtual register address locations 40 reserved in the register address map. Each reserved virtual register address location 40 will initiate an indirect addressing mode when accessed.

Presently there are five types of indirect address modes: simple indirect addressing, indirect addressing with auto post increment, indirect addressing with auto post decrement, indirect addressing with auto pre increment, and indirect addressing with offset. In a simple indirect addressing mode, the address of the operand is held in the data pointer register 38. The CPU 32 will access the data pointer register 38 to get the address and using this address will access the operand. Indirect addressing with auto increment or auto decrement are forms of indirect addressing where the data pointer register 38 is incremented or decremented either before the data access (i.e., pre-increment or pre-decrement) or after the data access (i.e., post-increment or post-decrement). In an indirect addressing mode with offset, the address of the operand is calculated by adding an offset value to the contents of the data pointer register 38. The offset value may be embedded in the instruction or may come from yet another register. In the preferred embodiment of the present invention, the offset value comes from the "w" register, which is the accumulator or "working" register.

The data pointer register 38 will require a separate virtual register address location 40 in data memory 12 for each indirect addressing mode the data pointer register 38 wants to implement. In the preferred embodiment of the present invention, five virtual register address locations 40 are required to implement the five indirect addressing modes discussed above. However, additional or fewer indirect addressing modes may be implemented depending on the use of the data pointer register 38. Furthermore, additional data pointer registers 38 may be implemented in data memory 12. Each data pointer register 38 will have one or more virtual register address locations 40 reserved in the register address map. Each reserved virtual register address location 40 will initiate an indirect addressing mode for the associated data pointer register 12 when that address is supplied to the address latch from the selection circuit 14.

While the invention has been particularly shown and described with reference to preferred embodiments thereof, it will be understood by those skilled in the art that the foregoing and other changes in form, and details may be made therein without departing from the spirit and scope of the invention.

What is claim is:

1. A processor architecture having a central processing unit, a data memory coupled to said central processing unit for storing and transferring data wherein said data memory has a plurality of addresses organized within a plurality of memory banks, a specific one of said plurality of addresses within said data memory being designated by a bank address value, said processor architecture comprising:

a selection circuit, said selection circuit coupled to said data memory;

an address latch, said address latch constructed and arranged to receive a bank address value from said selection circuit; and a plurality of address sources, said plurality of address sources comprising:

a bank select register connected to a first input of said selection circuit, said bank select register constructed and arranged to supply a bank address value for an instruction to be executed in a direct short addressing mode;

an instruction register, said instruction register coupled to a second input to said selection circuit, said instruction register further constructed and arranged to supply an instruction to be executed in a direct long addressing mode;

a force bank register coupled to a third input to said selection circuit, said force bank register constructed and arranged to supply a bank address value for a bank of said data memory dedicated to general and special purpose registers, said force bank register further constructed and arranged so that, when accessed, said force bank register will force data access to take place on said dedicated bank while not modifying a currently selected bank address to be executed; and one or more file select registers coupled to a fourth input to said selection circuit, said file select registers constructed and arranged to store and to supply bank address values in an indirect mode;

wherein said selection circuit is used for selecting one of said plurality of sources that supply a bank address value and for overriding said bank select register in order to send a complete address value to said address latch.

2. A processor architecture as in claim 1 wherein said selection circuit is a multiplexer.

3. A processor architecture as in claim 1 wherein said bank select register is a 4 bit wide register.

4. A processor architecture as in claim 1 wherein said instruction register is capable of storing and supplying an address long enough to access the entire address range of said data memory.

5. A processor architecture as in claim 1 wherein said file select registers are capable of storing and supplying an address long enough to access the entire address range of said memory.

* * * * *